United States Patent [19]
Frappier et al.

[11] 3,790,399
[45] Feb. 5, 1974

[54] METHOD AND APPARATUS FOR EDGE SEALING CORRUGATED PAPERBOARD

[75] Inventors: Robert H. Frappier, Agawam, Mass.; Hal W. Tanner, Jr., Georgetown, S.C.; William O. Wagers, Massillon, Ohio

[73] Assignee: International Paper Company, New York, N.Y.

[22] Filed: Sept. 30, 1971

[21] Appl. No.: 185,323

Related U.S. Application Data

[62] Division of Ser. No. 851,973, Aug. 21, 1969, abandoned.

[52] U.S. Cl............ 117/44, 156/196, 156/198, 156/210, 161/99, 161/108, 161/133, 161/134, 161/147, 161/149
[51] Int. Cl............................................. D21b 1/10
[58] Field of Search..........93/36 MM, 36 PC, 36 R; 117/43, 44; 118/44; 156/196, 198, 210; 161/43, 44, 99, 108, 133, 134, 147, 149

[56] References Cited
UNITED STATES PATENTS

| | | | |
|---|---|---|---|
| 3,563,843 | 2/1971 | Wagers et al. | 161/102 |
| 2,293,747 | 8/1942 | Koch | 117/43 X |
| 2,694,648 | 11/1954 | Muench | 117/44 |
| 2,742,724 | 4/1956 | Fleiss | 161/43 |
| 3,107,586 | 10/1963 | Ragan | 93/36 MM |
| 3,406,052 | 10/1968 | Peters | 161/149 X |
| 3,540,354 | 11/1970 | Tachibana et al. | 93/1 |

*Primary Examiner*—William D. Martin
*Assistant Examiner*—M. R. Lusignan

[57] ABSTRACT

A corrugated core paperboard in which the edges of the the core convolutions are sealed by method and apparatus for preparing a film of thermoplastic material along the board edges; the method including the steps of feeding the board along a path, passing the edge of the board through an applicator and applying a film of thermoplastic material to the board edge as the edge passes through the applicator; the apparatus including driven belts between which the board is fed in a path, an applicator along the edge of the path and means for feeding thermoplastic material to the applicator.

5 Claims, 18 Drawing Figures

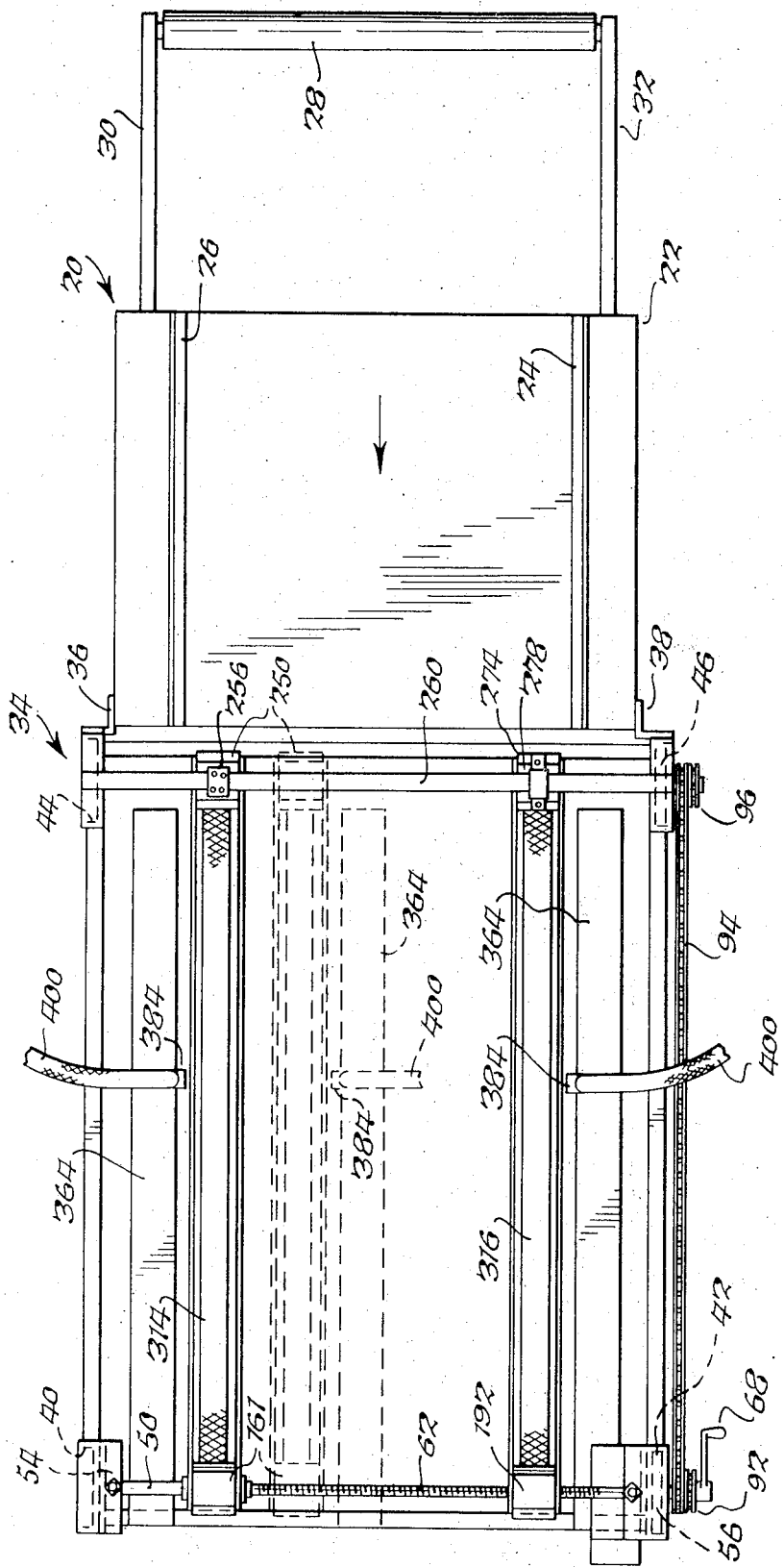

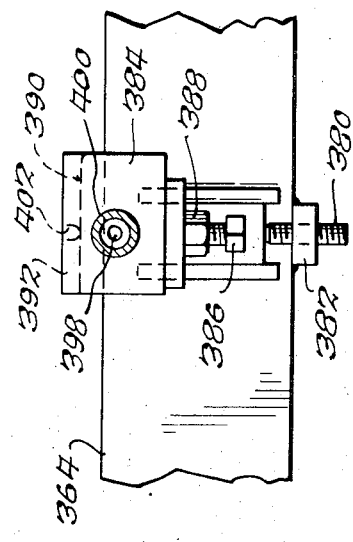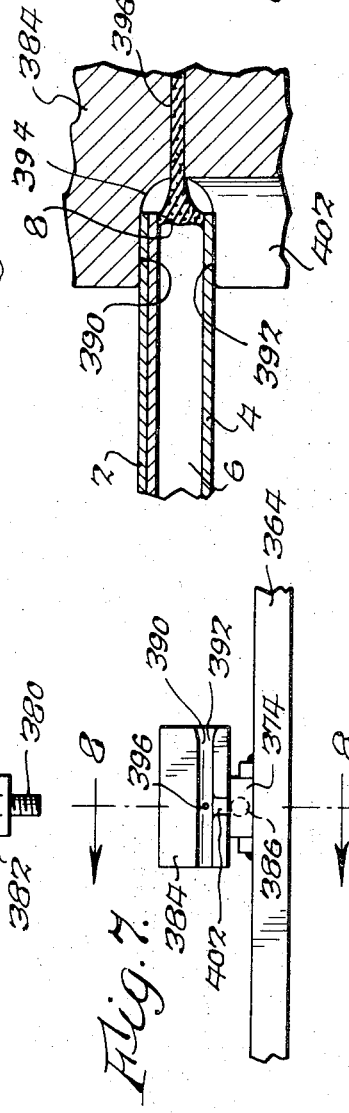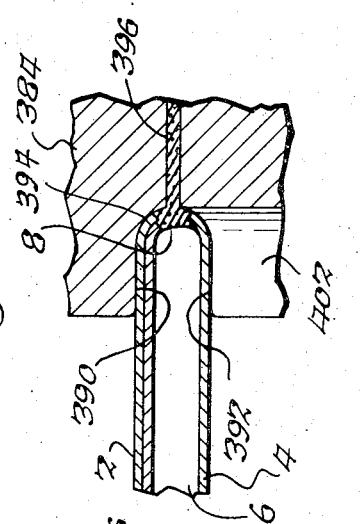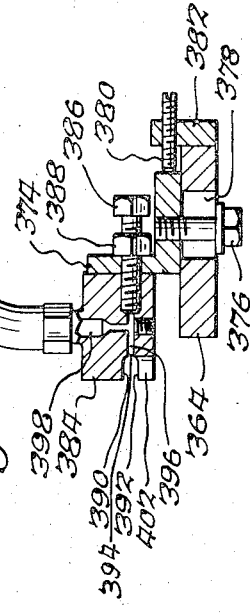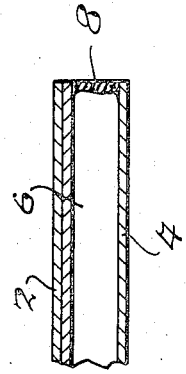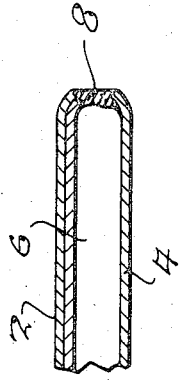

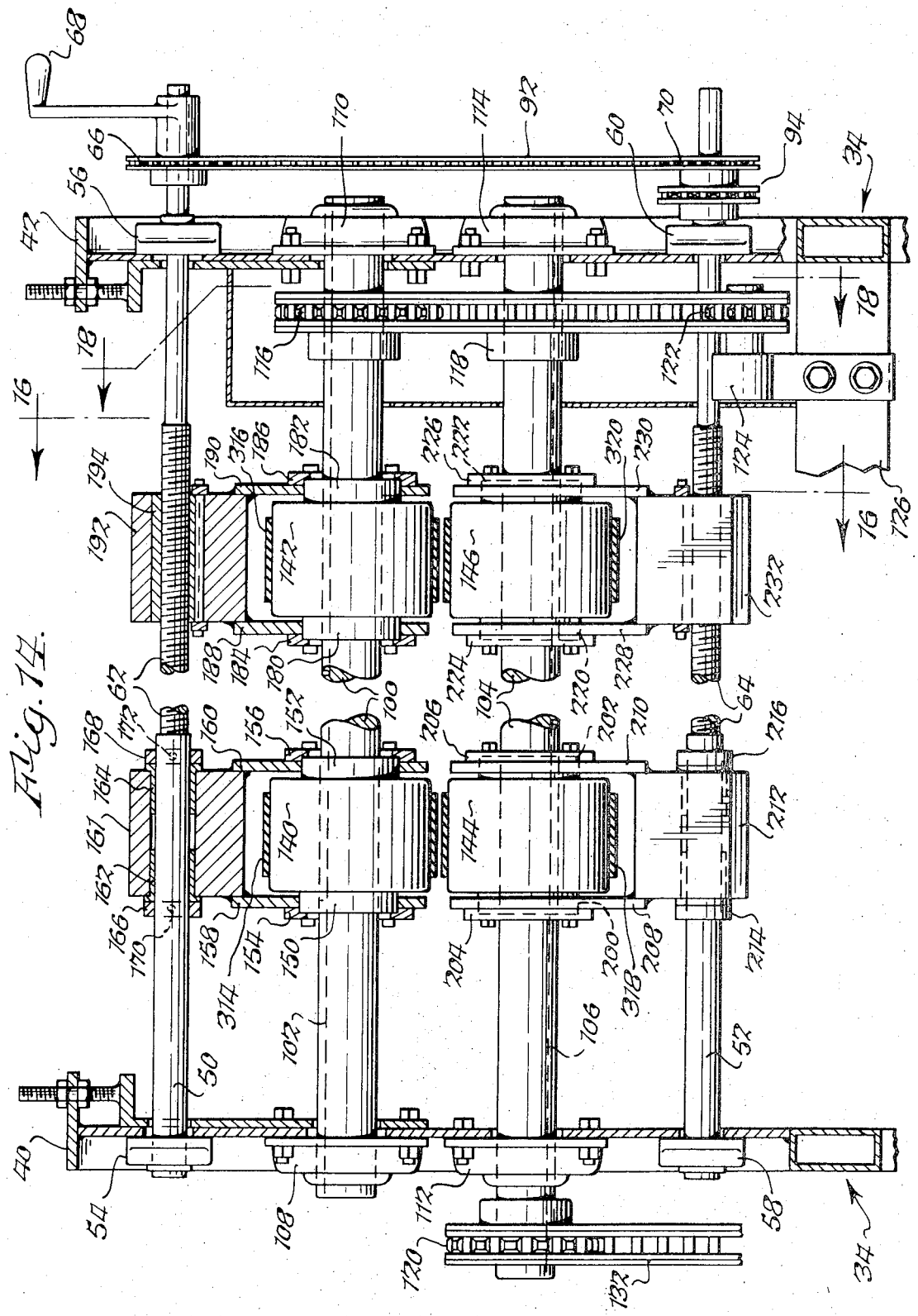

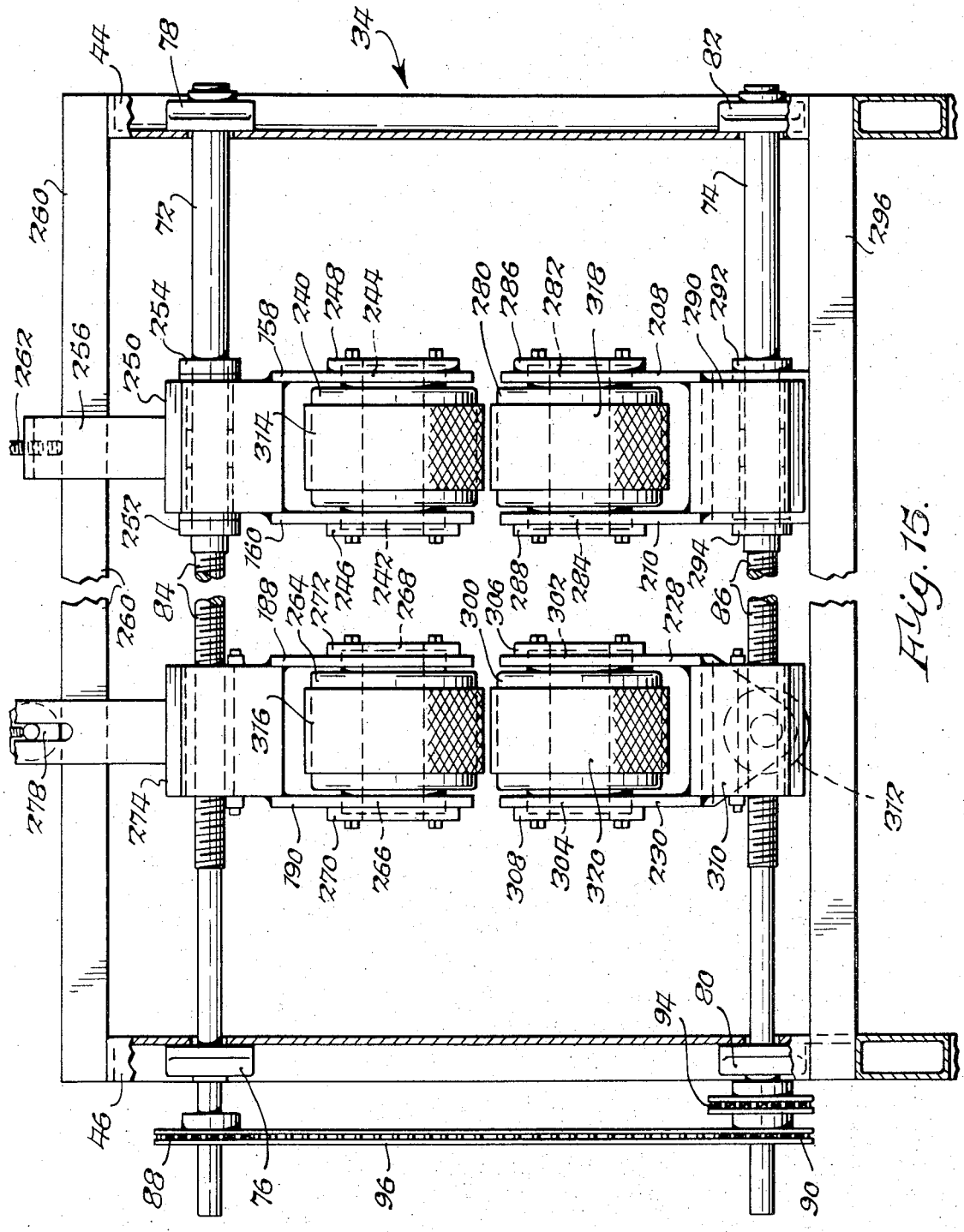

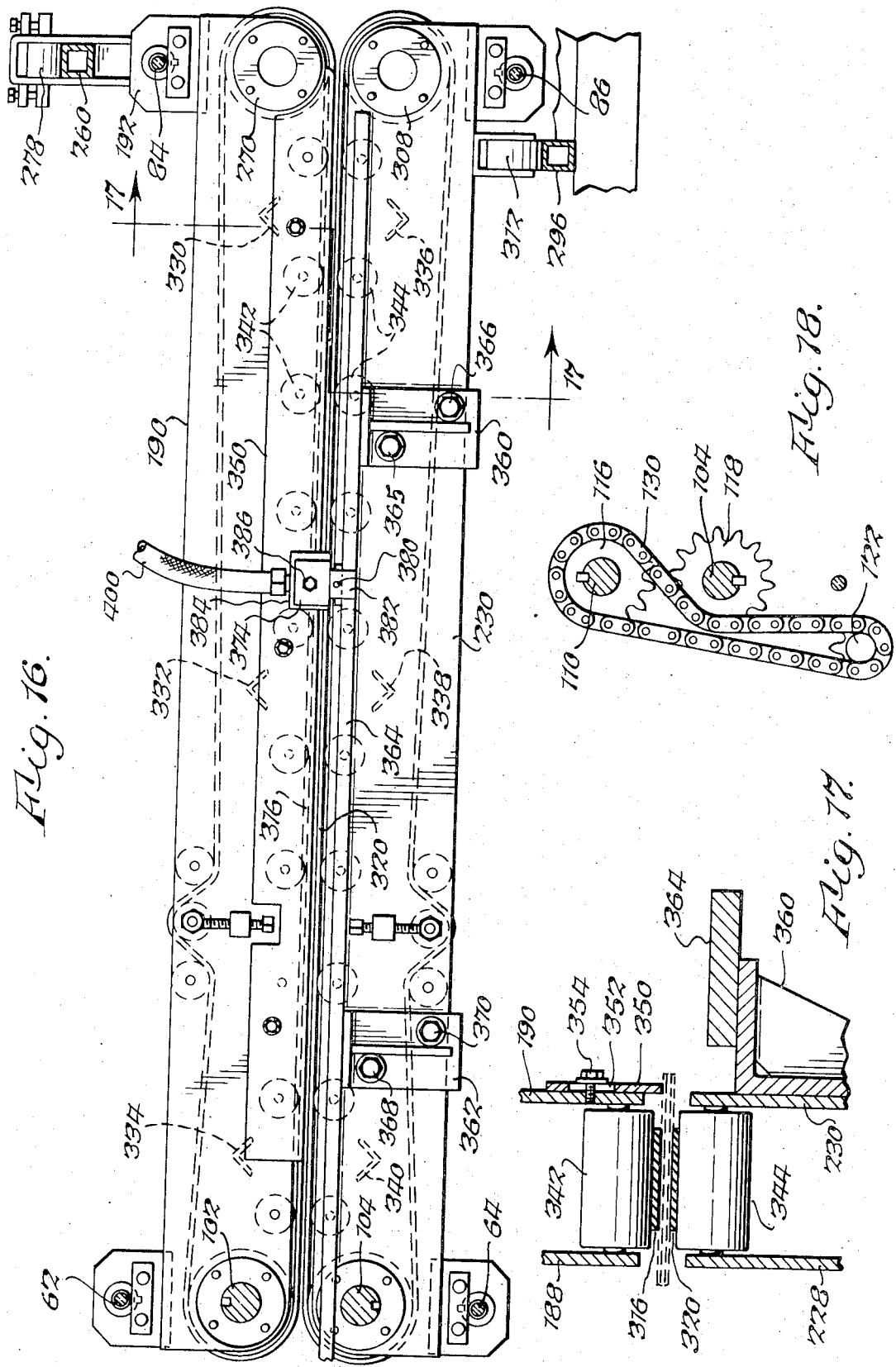

METHOD AND APPARATUS FOR EDGE SEALING CORRUGATED PAPERBOARD

CROSS REFERENCE TO RELATED APPLICATION

This application is a divisional application of application Ser. No. 851,973, filed Aug. 21, 1969, in the name of the present inventors, and now abandoned.

This invention relates to corrugated core paperboard and, more particularly, to such paperboard in which one or more of the edges of the corrugated core are closed or sealed and to methods and apparatus for the manufacture thereof.

Corrugated core paperboard, having a corrugated core with facing sheets adhesively secured to the opposite faces thereof, is used for many purposes including packages and containers for a wide variety of products. The convolutions of the corrugated core space the facing sheets and, at the opposite edges of the board, form openings or spaces into which dirt, liquid, foreign matter or the material packaged in the container might flow. Such dirt, liquid, foreign matter, or the like, when it flows into the convolution opening, not only detracts from the appearance and sanitary condition of the container but, in many instances, weakens the core and facing sheets and the adhesive bond interconnecting such core and facing sheets. Because the corrugated core material and inner surfaces of the facing sheets are, in most instances, relatively absorbent, the board is especially weakened when the material flowing into the openings or spaces is liquid.

Various attempts have, heretofore been made to close or seal the open, fluted edges of corrugated paperboard. In one such arrangement, the open, fluted edge of the corrugated paperboard is passed through an extruder and a U or V-shaped bead of thermoplastic material is extruded onto the edge. Such a U or V-shaped bead, extruded onto the edge, thickens the edge of the paperboard which, in some operations, might interfere with further processing, for example, printing, of the paperboard or, in other operations, might become crushed in further processing. Moreover, extruding a thermoplastic bead along the edge substantially increases the cost of the corrugated paperboard.

In the instant invention, the open, fluted edge of corrugated paperboard is sealed by forming a thin film of thermoplastic material over the flute openings and edges of the facing sheets. This is accomplished by passing the edge of the board through an applicator and, as the edge of the paper-board passes through the applicator, coating the edge with the thermoplastic material. Preferably, only enough thermoplastic material is fed to the applicator to form a thin film along the edge. Such film need not be continuous so long as it is substantially impervious to liquid, dirt and the like. The thermoplastic material is applied without pressure and without an excess of the material. Thus, the excess of the thermoplastic material is drained away from the applicator.

In the preferred embodiment of the instant invention, the open, fluted edge of corrugated paperboard is passed through an applicator and the ends of the facing sheets are rolled inwardly, toward each other, thereby partially closing the corrugated core flute openings with the rolled ends of the facing sheets at the edge of the board. With the facing sheet ends rolled inwardly toward the center of the board at the edge and while the edge is still in the applicator, a coating of thermoplastic material is applied to the edge to form a thin film along the edge between the rolled ends of the facing sheets. The thin film, thus formed, seals the flute opening and edges of the facing sheets at the board edge.

The invention will be more fully understood from the following description and appended drawings in which:

FIG. 5 is a top plan view of the machine of FIG. 4;

FIG. 6 is a horizontal view, taken at 6—6, FIG. 4, of the sealing applicator on the apparatus of the instant invention;

FIG. 7 is a vertical view of the applicator showing the inside applicator face;

FIG. 8 is a vertical section of the applicator taken along 8—8, FIG. 7.

FIG. 9 is a cross sectional view showing the untreated edge of the corrugated core paperboard before the edge is treated;

FIG. 10 is a cross sectional view, taken through the corrugated core paperboard and the applicator, showing the edge sealed in accordance with one embodiment of the invention;

FIG. 11 is a view of the treated, corrugated board showing the edge sealed in accordance with one embodiment of the invention;

FIG. 12 is a view, similar to FIG. 10 and showing the edge of the board treated in accordance with the preferred embodiment and the applicator;

FIG. 13 is a view, similar to FIG. 12, but without the applicator, showing the corrugated core paperboard treated in accordance with the preferred embodiment;

FIGS. 14 and 15 are vertical sections taken through the machine at lines 14—14, 15—15, respectively, FIG. 4;

FIG. 16 is a cross section taken at lines 16—16, FIG. 14;

FIG. 17 is an enlarged detail taken at 17—17, FIG. 16; and

FIG. 18 is an enlarged detail taken at line 18—18, FIG. 14.

Figure 3:
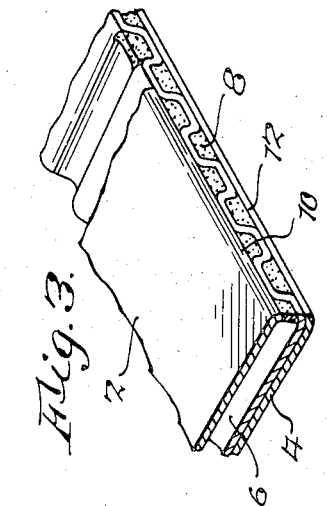
FIG. 3 is a view, similar to FIG. 2 and showing the ends of the facing sheets, at the board edge, rolled inwardly, toward each other, showing the edge of the board as sealed in the preferred embodiment of the invention.
Figure 2:
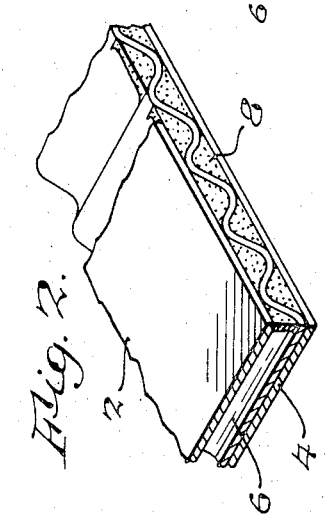
FIG. 2 is a view, similar to FIG. 1, with a portion of one facing sheet broken away and showing the edge of the board as sealed in one embodiment of the invention.
Figure 1:
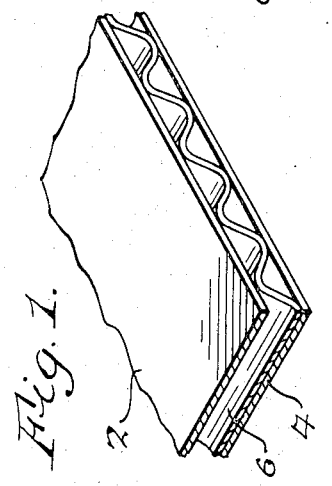
FIG. 1 is a fragmentary perspective view of a corrugated paperboard having an open, untreated edge.

Referring to FIGS. 1 to 3, the corrugated paperboard includes facing sheets 2, 4, adhesively secured to the opposite sides of corrugated core 6, in the customary manner, such as on a conventional corrugated paperboard machine. The edge, or edges, of the corrugated paperboard to be closed are preferably trimmed, if necessary, so that, at each edge to be closed, the ends of facing sheets 2, 4 and core 6 are substantially flush or in substantial alignment with each other. The edge, or edges, so trimmed are advanced longitudinally of the edge, through an applicator. Facing sheets 2, 4, as the corrugated core paperboard advances through the applicator, engage corresponding walls of the applicator and form a seal therewith. The inner wall of the applicator is spaced outwardly, joining the applicator walls in engagement with the paperboard facing sheets, is spaced from the edge of the paperboard and a supply of liquid, thermoplastic material, for example, wax, compatible with the edge of the paperboard is supplied to the space, in the applicator, at the edge of the board. As will be described later herein, such space in the applicator into which such thermoplastic material is fed, is provided with a drain so that any excess thermoplastic material in such space will drain out of the applicator.

As the open, corrugated edge, of the paperboard passes through the liquid, thermoplastic material in the applicator, the edge of the board picks up a thin film of the thermoplastic material which, upon setting, forms the thin, flexible film 8 along the edges of facing sheets 2, 4, corrugated core 6 and over the ends of the convolution openings between core 6 and facing sheets 2, 4. In the preferred embodiment of the invention, the applicator, in addition to applying the thermoplastic material to the edge of the board, rolls edge 10 of sheet 2 and edge 12 of sheet 4 inwardly, toward each other. Thus, in the embodiment of FIG. 3, the corrugated core edge is partially closed by the rolled in edges 10, 12 of facing sheets 2, 4. The edge of the board, between rolled edges 10, 12 of facing sheet 2, 4, is sealed by thermoplastic film 8.

In the apparatus and method of the instant invention, the edge, or edges, of the corrugated board to be sealed are fed through an applicator by feeding a sheet of corrugated paperboard along a path in a direction transverse to the direction of the convolutions of the corrugated core. An applicator is positioned at the side of the path along which the open edge, to be sealed, will pass. When both edges of the corrugated paperboard are to be sealed, applicators are positioned along both path lines.

The applicators are positioned along the path sides so that the board edge to be sealed passes into, and through, the applicator. The top and bottom facing sheets of the board engage the upper and lower walls, respectively, of the applicator slot. In the preferred embodiment of the invention, the applicators are positioned so that the edges of the top and bottom facing sheets of the board engage the arcuate wall of the applicator joining the top and bottom applicator walls. By engaging such arcuate applicator wall, the edges of the corrugated core, paperboard, top and bottom facing sheets, at the corrugated board edge, are rolled inwardly, toward each other, partially closing the open edge of the corrugated core. Thermoplastic material is picked up by the board edge as it passes through the applicator, and the thermoplastic material is spread along the opening between the edges of the facing sheets. Upon setting, the thermoplastic material forms a thin, flexible film 8 along the edges of facing sheets 2, 4, corrugated core 6 and between the facing sheets, sealing the open end of the core convolutions between the facing sheet edges.

Referring to FIGS. 4 to 18, the apparatus of the instant invention includes a table, generally designated 20, having top 22, with guides 24, 26. Roller 28, mounted on arms 30, 32, extends outwardly from one end of table 20 in substantial alignment with top 22. Machine frame, generally designated 34, is attached to opposite end of table 20 by brackets 36, 38. Supports 40, 42, 44, 46 extend upwardly from the four corners of machine frame 34.

Shafts 50, 52 are mounted, at their opposite ends, in bearings 54, 56, 58, 60, fixed to supports 40, 42 and, intermediate their ends, are threaded at 62, 64 (FIG. 14), for purposes hereinafter described. Sprocket 66 and crank handle 68 are keyed to one end of shaft 50 and double sprocket 70 is keyed to the end of shaft 52.

Figure 4:
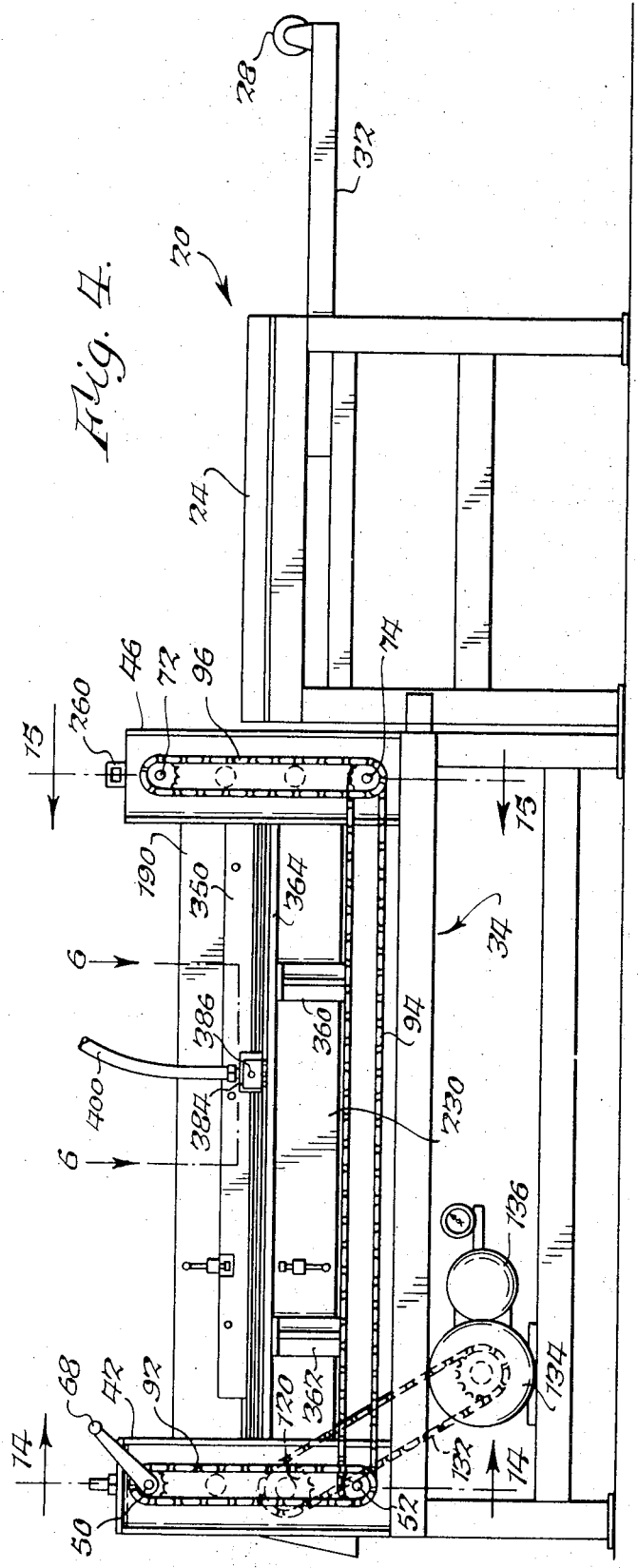
FIG. 4 is a side elevational view of the machine of the instant invention for sealing the edges of corrugated core paperboard.

Referring to FIGS. 4 and 15, shafts 72, 74 are mounted, at their opposite ends, in bearings 76, 78, 80, 82, fixed to supports 44, 46, respectively, and are threaded, intermediate their ends, at 84, 86, for purposes later described. Sprocket 88 is keyed to the end of shaft 72 and double sprocket 90 is keyed to the end of shaft 74. Sprocket 66 is connected to one sprocket of double sprocket 70 by chain 92 (FIGS. 4 and 14) and the other sprocket of double sprocket 70 is connected by chain 94 to one of the sprockets of double sprocket 90. The other sprocket of double sprocket 90 is connected by chain 96 to sprocket 88. By turning crank 68, shafts 50, 52, 72, 74 are rotated in their respective bearings in supports 40, 42, 44, 46 through the inter connection of chains 92, 94, 96, sprocket 66, 70, 88 and 90 keyed, respectively, to shafts 50, 52, 72, 74.

As best shown in FIG. 14, shaft 100, having longitudinally extending keyway 102, and shaft 104, having a longitudinally extending keyway 106, are mounted, at their opposite ends, for rotation in bearings 108, 110, 112, 114 fixed to supports 40, 42, respectively. Sprocket 116 is keyed to shaft 102 and sprockets 118, 120 are keyed to shaft 104. Idler sprocket 122 is mounted for rotation on bracket 124 fixed to member 126 of frame 34. Referring to FIG. 18, sprockets 116, 118, 122, are interconnected by chain 130. Sprocket 120 is connected by chain 132 to variable speed drive 134 driven by motor 136, FIG. 4.

Belt driving rolls 140, 142 are keyed to shaft 100 in longitudinal keyway 102 and belt drive rolls 144, 146 are keyed to shaft 104 by longitudinal keyway 106. Belt driving roll 140 is held in fixed position on shaft 100 by thrust bearings 150, 152, mounted in plates 154, 156 attached by bolts to plates 158, 160, fastened, as by, for example, welding, to block 161, mounted, by bearings 162 and 164 and collars 166, 168, fixed, by set screws 170, 172, to shaft 50. Belt driving roll 142 is held in fixed position on shaft 100 by thrust bearings 180, 182 mounted in plates 184, 186 bolted to plates 188, 190, respectively, fastened, as by, for example, welding, to block 192 threaded by sleeve 194 to threads 62 on shaft 50.

Belt driving roll 144 is held in fixed position on shaft 104 by thrust bearing 200, 202 mounted in plates 204, 206 bolted to plates 208, 210 fastened, as by, for example, welding to block 212 mounted in fixed position on shaft 52 by collars 214, 216. Belt driving roll 146 is held in fixed position on shaft 104 by thrust bearing 220, 222 mounted in plates 224, 226 bolted to plates 228, 230 fastened, as by, for example, welding to block 232 threaded to threads 64 on shaft 52.

Referring to FIG. 15, plates 158, 160, 188, 190, 208, 210 and 228, 230 (FIGS. 14 and 15) extend longitudinally of frame 34. Belt roll 240 is mounted for rotation on plates 158, 160 by bearing 242, 244 mounted on plates 246, 248 bolted to plate 158, 160. Plates 158, 160 are fastened, as by, for example, welding, to block 250 mounted in fixed position by collars 252, 254 on shaft 72. Extension 256 of block 250 extends over transverse frame member 260 of frame 34 and has adjusting set screw 262 for adjusting the vertical position of block 250 and belt roll 240.

Belt roll 264 is mounted for rotation on plates 188, 190 by bearing 266, 268 mounted on plates 270, 272 bolted to plates 188, 190. Plates 188, 190 are fastened, as by, for example, welding, to block 274 threaded on threads 84 of shaft 72. Roller 278 on extension 276 of block 274 is supported on the upper surface of transverse frame member 260.

Belt roll 280 is mounted for rotation on plates 208, 210 by bearings 282, 284 mounted on plates 286, 288 bolted to plates 208, 210. Plates 208, 210 are fastened, as by, for example, welding, to block 290 mounted in fixed position on shaft 74 by collars 292, 294. Block 290 rests on transverse frame member 296 of frame 34.

Belt roll 300 is mounted for rotation in plates 228, 230 by bearing 302, 304 mounted in plates 306, 308 bolted to plates 228, 230. Plates 228, 230 are fastened, as by, for example, welding, to block 310 threaded onto threads 86 of shaft 74 and roller 312 of block 310 rests on transverse frame member 296.

Endless belt 314 extends around belt driving roll 140, and belt roll 240. Endless belt 316 extends around belt driving roll 142 and belt roll 164. Endless belt 318 extends around belt driving roll 144 and belt roll 280. Endless belt 320 extends around belt driving roll 146 and belt roll 300. The outer surface of endless belts 314, 316, 318, 320 are roughened so that, as a sheet of corrugated core paperboard is fed between the opposing roughened surfaces of the belts, the opposing roughened belt surfaces engage and feed the board longitudinally between the belts. By rotating shafts 50, 52, 72, 74 with crank 68, and the chains and sprockets associated therewith, the spacing of opposed belts 314, 318 with opposed belts 316, 320 may be adjusted for wider or narrower sheets.

In the illustrated embodiment of the apparatus of the instant invention, the open, or fluted edges of the core of the corrugated paperboard, at the opposite edges of the board, as the board is fed through the apparatus, pass through an applicator where a thermoplastic material, in the form of a thin film, is applied to the edge of the core to seal the core. This is accomplished at one edge or at both edges simultaneously by components located along the edge of the paperboard feed path as the board is fed between belts 314, 318 and 316, 320. Such components, where both edges are to be sealed simultaneously, are mounted on plates 190, 230 and 158, 200 and are movable with such plates as the plates and belts are adjusted with crank 68 to accommodate wider or narrower boards. Because such thermoplastic applicator components on the respective plates are identical, the components attached to plates 190, 230 are described, it being understood, however, that in the embodiment of the apparatus for sealing both edges, simultaneously, such components are duplicated on plates 158, 200.

Referring to FIGS. 6, 7, 8, 16 and 17, plates 188, 190 are held in fixed, parallel, spaced position by spacers 330, 332, 334 and plates 228, 230 are held in fixed, parallel, spaced position by spacers 336, 338, 340. Roller 342, mounted at their opposite ends in plates 188, 190 engage belt 316 and rollers 344, mounted at their opposite ends in plates 228, 230 engage belt 320. Rollers 342, 344 hold the respective belts 316, 320 in engagement with the facing sheets of the corrugated core paperboard.

Guide plate 350, having slots 352, is adjustably mounted on plate 190 by bolts 354. The lower edge of guide plate 350 is adjusted by slots 352 and bolts 354 to engage and guide the upper surface of the corrugated core paperboard as the board is fed through the apparatus.

Brackets 360, 362 are mounted on plate 230 by bolts 365, 366, and 368, 370, respectively, and plate 364 is fastened to brackets 360, 362 as by, for example, welding. With particular reference to FIGS. 6, 7 and 8, adjustable bracket 374 is mounted on plate 364 and is held in adjusted position thereon by bolt 376 in slot 378 in plate 364 and adjusting screw 380 threaded in member 382 fixed as by, for example, welding to plate 364. Applicator 384 is mounted on adjustable bracket 374 by bolt 386 and locking nut 388.

Referring to FIGS. 6, 7 and 8, applicator 384 has, at its face, facing the corrugated board path, a slot formed by upper and lower walls 390, 392 and inner curved wall 394 joining walls 390, 392. At the entrance end of the slot, at the right hand end, FIG. 7, walls 390, 392 flair away from each other, forming an enlarged entrance for the board edge. Thermoplastic fluid passage 396 opens into the slot and is connected by passage 398 and conduit 400 to a thermoplastic material source, not shown. The lower wall 392 of the applicator slot has a drain 402 which, as later described, allows excess thermoplastic material fed to the slot through passage 396 to drain out of and away from the applicator slot. Such material, draining out of and away from the slot can, of course, be recycled, reheated and refed to the applicator slot.

In the operation of the apparatus of the instant invention, corrugated paperboard, with its edge or edges to be closed trimmed so that the edges are substantially square and with the facing sheet edges substantially flush with the ends of the core convolutions, is fed through the apparatus in the direction of the arrow, FIG. 5, and transverse to the direction of the convolutions of the core of the corrugated paperboard. The board may be fed as a continuous strip from the end of a corrugated paperboard machine producing such board, may be fed from a supply roll or may be cut into sheets and the sheets may be fed, one after the other, through the apparatus. Before feeding of the board commences, the width of the machine between feed belts 314, 318 and 316, 320 and the applicators is adjusted to the board width by turning crank 68 and by adjusting and locking applicators 384 on plate 364. Guides 24, 26 on table 20 are adjusted to guide the corrugated board into the apparatus.

With motor 136 running, and through variable speed drive 134, driving belts 314, 318, 316, 320, the belts feed the corrugated paperboard through the machine. Plates 350 are adjusted so that the upper facing sheet surface slides along the bottom surface of the plates.

The feed of thermoplastic material through conduit 400 and passages 398, 396 is adjusted so that, at the open end of passage 396, a constant supply of thermoplastic material is maintained as the edge of the corrugated board is passing through the applicator. This is important because, if too little material is supplied, the required film of thermoplastic material will not be formed along the edge of the board. If, on the other hand, excess material is supplied, such excess material, over and above that deposited as a film along the edge of the board, will drain off through drain 402. In any event, the thermoplastic material is coated onto, and not pressure forced into, the board edge. Thus, there is formed along the edge, a thin film and the thermoplastic material is not forced into the open corrugated ends.

The corrugated paperboard edge, as it passes the end of passage 396, picks up a film of thermoplastic material. Depending upon the speed at which the paperboard is fed, the thickness of the board, the size of the opening at the end of passage 396, such film along the edge of the board may be formed with one application or a plurality of applications in spaced alignment.

The applicators may be adjusted so that the edges of the upper and lower facing sheets engage upper and lower walls 390, 392 without engaging inner curved wall 394 or so that the edges of the facing sheets engage the inner curved wall. When inner curved wall 394 is not engaged, the thermoplastic material is deposited between the facing sheets and forms film 8, FIG. 2, therebetween. When on the other hand inner curved wall 394 is engaged, the edges 10, 12 of facing sheets 2, 4, FIG. 3, are deflected or curved inwardly, toward each other, as the thermoplastic material is being deposited. Thus, in the embodiment of the invention, as shown in FIG. 3, the space between the facing sheet edges is substantially reduced and the amount of thermoplastic material deposited and forming film 8, is decreased.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. In an apparatus for edge sealing a corrugated paperboard with a thermoplastic film, wherein the paperboard comprises a corrugated core and facing sheets secured to the core, which includes means for advancing the paperboard in a direction transverse to the convolutions of the core, and applicator means for applying a plastic film across an edge of the paperboard, an improved applicator means comprising:
   1. a stationary block having a slot in a surface thereof which extends in a direction substantially parallel to the direction in which the paperboard is advancing, the block being disposed along the direction of advance so that an edge of the paperboard which is transverse to the convolutions of the core passes through the slot and is enclosed within the slot, said slot being formed by:
      a. a flat upper wall slidably engaging the outer surface of the upper facing sheet of the paperboard;
      b. a flat lower wall slidably engaging the outer surface of the lower facing sheet of the paperboard;
      c. an intermediate wall inward of the block surface and adjacent the edge of the paperboard passing through the slot, said intermediate wall connecting said upper and lower wall and having therein a chamber communicating with the slot; and
      d. a flared enlargement at the end of the slot at which the paperboard enters for guiding the paperboard into the slot; and
   2. means for injecting thermoplastic through the chamber in the intermediate wall into the slot against the moving edge of the paperboard passing through the slot and directly against the exposed corrugated core of the paperboard to seal the edge with a thermoplastic film formed by said injection, said film extending only across the edge of the paperboard.

2. The improved applicator of claim 1 wherein the lower wall of the slot contains a drain for draining off and recovering excess thermoplastic injected into the slot.

3. The improved applicator of claim 1 where the intermediate wall is arcuate to thereby cause the facing sheets upon engaging the arcuate intermediate wall to bend inwardly toward the corrugated core prior to said thermoplastic being applied to the edge.

4. In a method for sealing an edge of a corrugated paperboard with a thermoplastic film, wherein the paperboard comprises a corrugated core and facing sheets secured to the core, which includes advancing the paperboard in a direction transverse to the convolutions of the core and past a thermoplastic applicator, and applying a thermoplastic film to an edge of the paperboard, the improvement which comprises:
   1. passing an edge of the paperboard which is transverse to the convolutions of the core through a stationary slot which extends in a direction substantially parallel to the direction in which the paperboard is advancing, the edge of the paperboard being enclosed within the slot, said slot being formed by:
      a. a flat upper wall slidably engaging the outer surface of the upper facing sheet of the paperboard;
      b. a flat lower wall slidably engaging the outer surface of the lower facing sheet of the paperboard;
      c. an intermediate wall inward of the block surface and adjacent the edge of the paperboard passing through the slot, said intermediate wall connecting the upper and lower wall and having therein a chamber communicating with the slot; and
      d. a flared enlargement at the end of the slot at which the paperboard enters for guiding the paperboard into the slot; and
   2. injecing settable fluid thermoplastic material through the chamber in the intermediate wall into the slot against the moving edge of the paperboard passing through the slot and directly against the exposed corrugated core of the paperboard to seal the edge with a thermoplastic film formed by said injection, said film extending only across the edge of the paperboard, and setting the thermoplastic material.

5. The improved method of claim 4 wherein the intermediate wall is arcuate, including the further step of causing the facing sheets of the paperboard to engage the arcuate intermediate wall thereby causing the facing sheets to bend inwardly toward the corrugated core prior to applying the thermoplastic material to the edge of the paperboard.

* * * * *

PO-1050
(5/69)

UNITED STATES PATENT OFFICE
CERTIFICATE OF CORRECTION

Patent No. 3,790,399      Dated February 5, 1974

Inventor(s) Robert H. Frappier, et al.

It is certified that error appears in the above-identified patent and that said Letters Patent are hereby corrected as shown below:

Column 5, line 34, "164" should be -- 264 --;

Column 8, line 59, "injecing" should be -- injecting --.

Signed and sealed this 21st day of May 1974.

(SEAL)
Attest:

EDWARD M. FLETCHER, JR.
Attesting Officer

C. MARSHALL DANN
Commissioner of Patents